(12) United States Patent
Padula et al.

(10) Patent No.: US 8,928,227 B2
(45) Date of Patent: Jan. 6, 2015

(54) LIGHT EMITTING BIO-MIMICRY DEVICE

(76) Inventors: Thomas John Padula, Ben Lomond, CA (US); Autumn Collett Cardone, Ben Lomond, CA (US)

( * ) Notice: Subject to any disclaimer, the term of this patent is extended or adjusted under 35 U.S.C. 154(b) by 1232 days.

(21) Appl. No.: 12/661,208

(22) Filed: Mar. 11, 2010

(65) Prior Publication Data

US 2011/0043241 A1 Feb. 24, 2011

Related U.S. Application Data

(60) Provisional application No. 61/236,107, filed on Aug. 23, 2009.

(51) Int. Cl.
*H05B 37/00* (2006.01)
*G01J 1/42* (2006.01)
*A63J 21/00* (2006.01)
*H05B 37/02* (2006.01)
*H05B 33/08* (2006.01)

(52) U.S. Cl.
CPC ........... *H05B 33/0854* (2013.01); *G01J 1/4204* (2013.01); *A63J 21/00* (2013.01); *H05B 37/029* (2013.01); *H05B 33/0842* (2013.01)
USPC ............................................. 315/86; 315/291

(58) Field of Classification Search
CPC ................................ H05B 37/00; H05B 37/02
USPC .............................. 315/86, 87, 291, 307, 312
See application file for complete search history.

(56) References Cited

U.S. PATENT DOCUMENTS

| | | | |
|---|---|---|---|
| 3,736,683 A | 6/1973 | Paquette | |
| 4,570,924 A | 2/1986 | Connelly | |
| 5,495,690 A | 3/1996 | Hunt | |
| 5,584,571 A | 12/1996 | Chandler et al. | |
| 6,664,744 B2 | 12/2003 | Dietz | |
| 6,851,208 B2 | 2/2005 | Carter | |
| 6,870,148 B2 | 3/2005 | Dietz et al. | |
| 7,008,795 B2 | 3/2006 | Yerazunis et al. | |
| 7,072,587 B2 | 7/2006 | Dietz et al. | |
| D580,074 S | 11/2008 | Taylor | |
| 7,649,323 B1 * | 1/2010 | Kuhlmann et al. | ....... 315/200 A |

(Continued)

OTHER PUBLICATIONS

Dietz et al: "Very Low-Cost Sensing and Communication Using Bidirectional LEDs", Technical Report Mitsubishi Electric Research Laboratories, (Jul. 1, 2003), XP007913121.

(Continued)

*Primary Examiner* — Daniel D Chang
(74) *Attorney, Agent, or Firm* — Patrick T. Reilly

(57) ABSTRACT

A system and method are provided for mimicking a bioluminescent signal from an animal or an insect, such as a firefly. A first version includes a controller, an electrical energy battery, a solar energy collector and a light emitting device. The solar energy collector receives sunlight and converts the sunlight to electrical energy that is stored in the battery. The electrical energy battery provides electrical energy to the light emitting device under management by the controller, and may comprise two or more battery cells or circuits. A time sequence for energizing the light emitting device may be applied to cause the light emitting device to mimic a bioluminescent lighting pattern generally exhibited by a selected species of insect or animal. A light emitting diode may be used with a voltage source and a voltmeter to detect the approximate intensity of light of an ambient environment surrounding the device.

20 Claims, 13 Drawing Sheets

(56) References Cited

U.S. PATENT DOCUMENTS

| | | | | |
|---|---|---|---|---|
| 7,812,547 | B2* | 10/2010 | Jaan | 315/291 |
| 2004/0056608 | A1 | 3/2004 | Dietz et al. | |
| 2008/0238345 | A1* | 10/2008 | Jaan | 315/325 |
| 2011/0012552 | A1* | 1/2011 | Margalit | 320/101 |

OTHER PUBLICATIONS

Dietz et al: "Very Low-Cost Sensing and Communication Using Bidirectional LEDs", Techincal Report Misubishi Electric Research Laboratories, (Jul. 2003), XP007902665.

* cited by examiner

LIGHT EMITTING BIO-MIMICRY DEVICE

CO-PENDING PATENT APPLICATION

The present disclosure is a Continuation-in-Part from and claims the priority date of Provisional Patent Application Ser. No. 61/236,107 as filed on Aug. 23, 2009 and titled "System and Method for Self Contained Solar Powered Firefly Simulation" by inventor Thomas John Padula. Provisional Patent Application Ser. No. 61/236,107 is hereby incorporated into the present patent application in its entirety and for all purposes.

FIELD OF THE INVENTION

The present invention relates to the field of electronic devices and particularly to electronic devices that mimic one or more aspects of the behavior of living creatures.

BACKGROUND OF THE INVENTION

A familiarity with the addition that light emitting insects add to the ambience of a night view leads many people to find enjoyment in their presence. Prior art electronic devices have been configured and programmed to emit light in an attempt to remind observers of the behavior of light emitting insects, such as the Coleoptera Lampyridae. There are more than 2,000 species of these nocturnal winged beetles that are commonly referred to as fireflies or lightning bugs. Fireflies can be found in temperate and tropical environments around the world. Firefly larvae can also emit light.

Fireflies are generally capable of producing a "cold light", containing little or no ultraviolet or infrared energy content. This chemically-produced light, emitted from the lower abdomen of the firefly, may be yellow, green, or pale red in color, and may emit light energy having a wavelength from 510 to 670 nanometers.

The pattern of firefly light emissions is predictable and can be mathematically modeled and reproduced by artificial means, such as by means of light emitting diodes. Yet the prior art fails to provide an electronic device configuration that employs stored electrical energy to power electronic light emitting devices in an optimal method of mimicking firefly light emissions.

There is a long-felt need to provide a device and method to optimally mimic the light emission behavior of an insect or animal.

SUMMARY OF THE INVENTION

This and other objects of the present invention are made obvious in light of this disclosure, wherein methods, systems and computer-readable media for mimicking the light emissions of a light emitting insect or other animal are disclosed. According to a first aspect of the method of the present invention, a system is provided that includes a controller, an electrical energy battery, a solar energy collector and a light emitting device. The solar energy collector receives sunlight and converts the sunlight to electrical energy that is stored in the battery. The electrical energy battery provides electrical energy to the light emitting device under management by the controller, and may comprise two or more battery cells or circuits.

The controller may be disposed between battery and the light emitter, whereby the electrical current travels through the control circuit en route to the light emitter. The controller may be programmable and the time sequence is reconfigurable. The time sequence may include a cycle time period that includes both a duration of stable or varying light emission from the light emitter and a separation time of little or no light emission, i.e. a light occlusion time. The controller may manage an electrical current provision to the light emitter in a power on time of the cycle time period (a.) in increasing ramp of light emission magnitude during a fade-on phase; (b.) in a decreasing ramp of light emission magnitude during a fade-off phase; (c.) in an increasing ramp of light emission magnitude during a fade-on phase of the lighting time period and in a decreasing ramp of light emission magnitude during a fade-off phase, whereby a bioluminescent lighting pattern is mimicked. The time sequence may alternately or additionally be applied to cause the light emitting device to mimic a bioluminescent lighting pattern generally exhibited by a selected species of insect or animal.

Additionally or alternatively, the light emitting device may generate a peak emission wavelength within the range of from 500 nanometers to 700 nanometers and/or within 50 nanometers of a bioluminescent light source. The light emitter may alternatively or additionally generate on the order of 25 candelas possibly in a dispersion pattern extending beyond 120 degrees in two orthogonal dimensions.

An alternate configuration of the present invention includes an ambient light sensor that communicates with the controller, wherein information provided by the ambient light sensor to the controller is applied to determine whether to provide electrical power to the light emitting device. The controller may compare the information provided by the ambient light sensor to a certain value and the controller provides and/or enables electrical power delivery to the light emitting device when the information provided by the ambient light sensor indicates that the ambient light is less than a pre-determined light intensity value. Alternatively or additionally, the controller may cease electrical current delivery to the light emitter when the ambient light sensor information provided by the ambient light sensor to the controller indicates that the ambient light is greater than a pre-determined light intensity value.

In a second alternate configuration, the light emitting device is or comprises a light emitting diode. Optionally or additionally the light emitting diode may act as an ambient light intensity detector. In certain alternate preferred embodiments of the method of the present invention, a same light emitting diode is applied as both an ambient light detector as well as a light emitting device.

Still other alternate preferred embodiments of the present invention include a clock circuit that measures time elapsed after the controller has initiated electrical power delivery to the light emitting diode, whereby the controller will enable power delivery for a pre-determined length of time and cease electrical power delivery after pre-determined length of time has elapsed.

In certain alternate preferred embodiments of the method of the present invention, a voltage source, voltage comparator circuit, and clock circuit are applied to determine the approximate intensity of ambient light. In these alternate variations that incorporate this aspect of the method of the present invention, a voltage is applied across a diode, such as a light emitting diode, and a time elapsed between the application of the voltage and the reduction of the voltage across the diode is measured and the resultant time value is compared with a predetermined value. When the comparison of time elapsed with the predetermined value indicates that the intensity of the ambient light to which the diode is exposed is approximately less than a prespecified light intensity, the controller initiates a lighting of the light emitting device.

According to additional alternate aspects of the method of the invention, brief pulses of light are emitted in a pattern of emission and occlusion that are timed to create a perception in a human or mammalian eye of a period of continuous illumination. The pulses of light may be intended to form a perception by a human or a mammal of a light pulse continuous illumination that includes (1.) a length of time of continuous and increasing illumination intensity; (2.) a length of time of continuous maintenance of a stable level of illumination intensity; and/or a length of time of continuous and increasing illumination intensity.

The foregoing and other objects, features and advantages will be apparent from the following description of aspects of the present invention as illustrated in the accompanying drawings.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include the article titled "Very Low-Cost Sensing and Communication Using Bidirectional LEDs", authored by Paul Dietz, William Yerazunis and Darren Leigh, published by Mitsubishi Electric Research Laboratories of 201 Broadway, Cambridge Mass. 02139 at the website www.merl.com and as scheduled to have been presented and disclosed to the public at UbiComp 2003, Seattle, Wash. as held on Oct. 12-15 2003.

Such incorporations further include U.S. Pat. No. 4,570,924 (Inventor: Connelly, K.; Issued on Feb. 18, 1986) titled "Firefly illusion"; U.S. Pat. No. 5,495,690 (Inventor: Hunt, J.: Issued on Mar. 5, 1996) titled "Electronic firefly lure"; U.S. Pat. No. 6,664,744 (Inventor: Dietz, P.; Issued on Dec. 16, 2003) titled "Automatic backlight for handheld devices"; U.S. Pat. No. 6,851,208 (Inventor: Carter, T.; Issued on February 2005) titled "Simulated firefly"; U.S. Pat. No. 6,870,148 (Inventors: Dietz, et al.; Issued on Mar. 22, 2005) titled "LED with controlled capacitive discharge for photo sensing"; U.S. Pat. No. 7,008,795 (Inventors: Yerazunis, et al.; Issued on Mar. 7, 2006) titled "Multi-way LED-based chemochromic sensor"; and U.S. Pat. No. 7,072,587 (Inventors: Dietz, et al.; and Issued on Jul. 4, 2006) titled "Communication using bi-directional LEDs".

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of various aspects of the present invention, may be better understood with reference to the accompanying specification, wherein.

DETAILED DESCRIPTION

It is to be understood that this invention is not limited to particular aspects of the present invention described, and as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Figure 1:
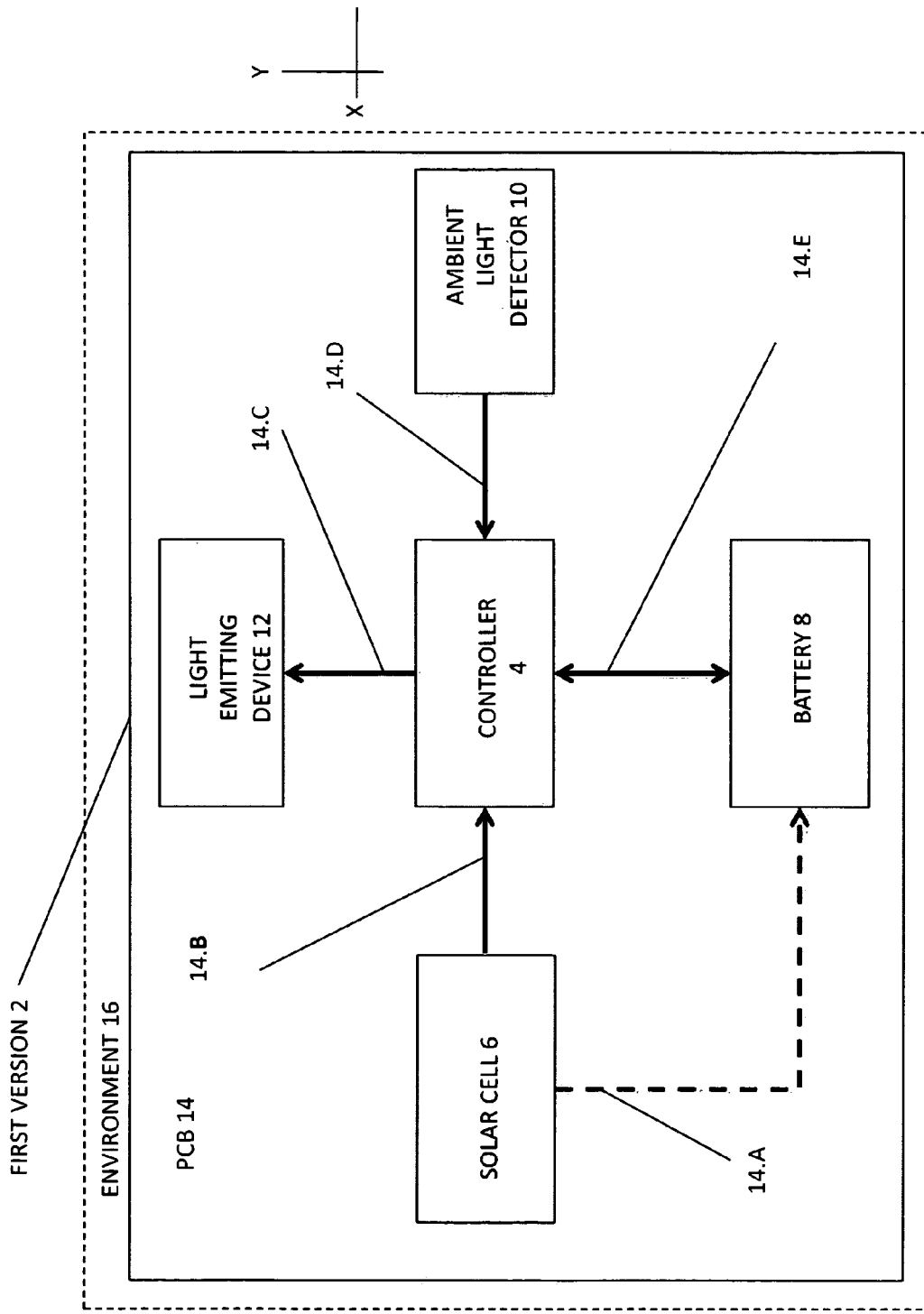
FIG. 1 is a schematic diagram of a first preferred alternate embodiment of the present invention that includes a controller, a light emitting device, an ambient light detector, a solar cell, and a battery.

Referring now to FIG. 1, FIG. 1 is a schematic diagram of a first preferred embodiment of the present invention 2 (hereinafter, "first version" 2). The first version 2 includes a controller 4, a solar cell 6, a battery 8, an ambient light detector 10, a light emitting device 12 and a printed circuit board 14. The controller 4 is configured and/or programmed to provide electrical power from the battery 8 to the light emitting device 10 for a period of time after the ambient light detector 10 indicates that an observed light intensity of the environment 16 of the first version 1 has decreased below a prespecified value. The solar cell 6 is positioned to receive light from the sun (not shown). The solar cell 6 is configured to capture photonic energy from received sunlight and generate electrical energy therefrom. The electrical energy generated by the solar cell 6 is transferred to the controller 4 and to the battery 8. The controller 4 further enables electrical energy to be provided from the battery 8 and to (a.) the ambient light detector 10 if and when required, (b.) and periodically to the light emitting device 12.

The controller 4, the solar cell 6, the battery 8, the ambient light detector 10, the light emitting device 12 are attached to the printed circuit board 14. Electrically conductive pathways 14.A-14.E of the printed circuit board 14 enable electrical measurements and signals of data and commands to pass between the controller 4, the ambient light detector 10, the light emitting device 12, the solar cell 6, and/or the battery 8. The electrically conductive pathways 14.A-14.E further enable electrical power to pass from the solar cell to the controller 4 and/or the battery 8, and from the battery 8 to the ambient light detector 10 and/or the light emitting device 12. The printed circuit board 14 is preferably shaped with a cross sectional area in an X-Y plane of less than two square inches.

In certain alternate preferred embodiments of the present invention, the controller may be PIC10F200™ microcontroller as marketed by Microchip, Inc of Chandler, Ariz.; the light emitting device may be an 1206 SMT™ light emitting diode as marketed by Dialight, Inc.; of Farmingdale, N.J. and the battery may be a V15H NiMH™ as marketed by Varta, Inc. of Hanover, FRG. The solar cell may be one or a plurality of BPW-34 ™ solar energy collector as marketed by Osram Corporation of Munich, FRG. The microcontroller 4 and the LED 20 may be additionally configured to emit light energy having a spectrum centered within the range of a 500 nanometer wavelength to a 700 nanometer wavelength, wherein more than half of the light energy emitted by the LED 20 is emitted in frequencies having wavelengths if the range of from 500 nanometers to 700 nanometers. The microcontroller 4 and the light emitting diode 20 may be additionally or alternately configured to emit light energy having a spectrum centered about a 570 nanometer wavelength, wherein more than half of the light energy emitted by the LED 20 is emitted in frequencies having wavelengths if the range of from 520 nanometers to 620 nanometers. The light emitting diode 20 may be additionally or alternately configured to emit light energy having a spectrum centered within 50 nanometers of a referent bioluminescent light source, e.g., a firefly.

Figure 2:
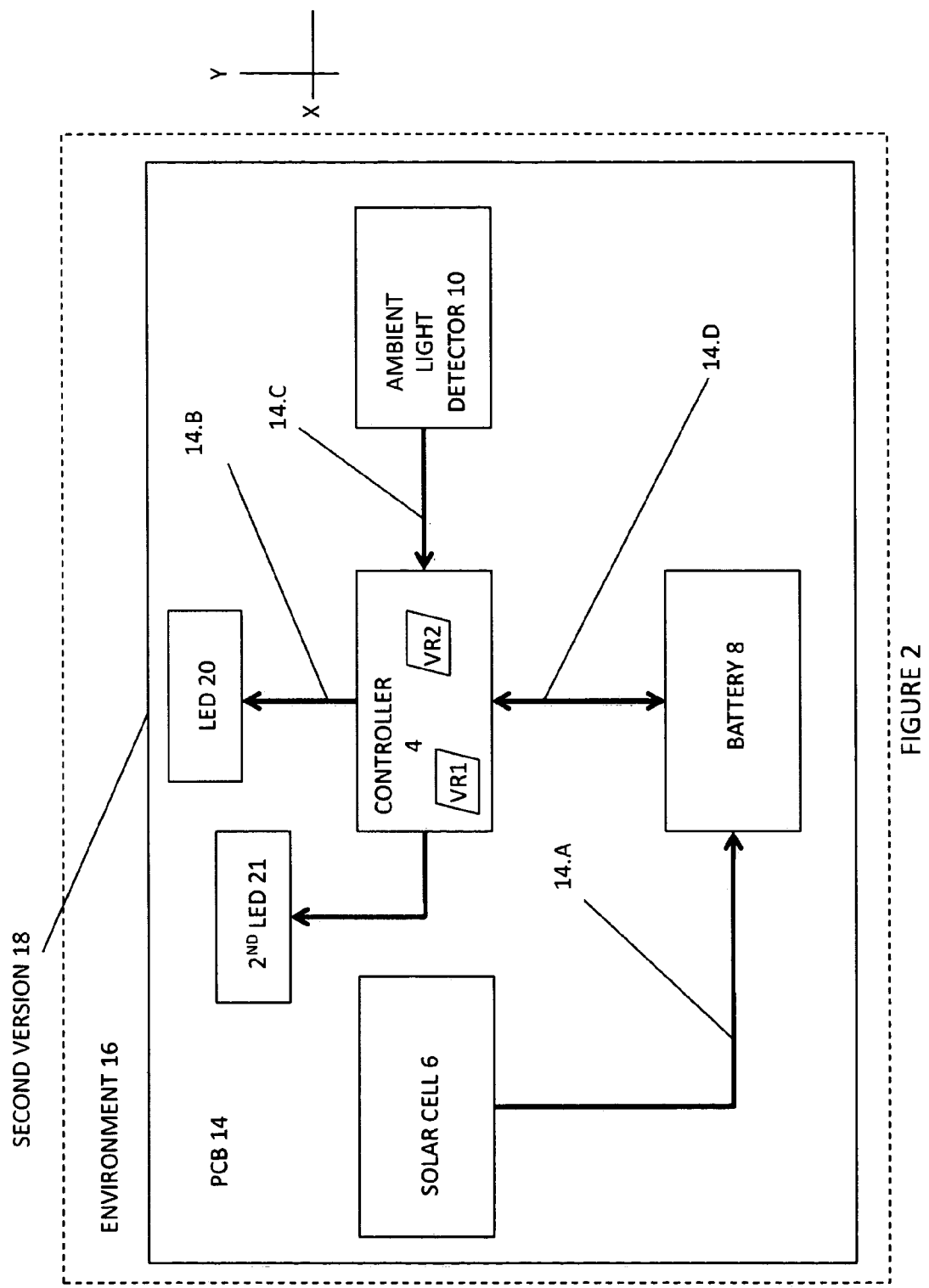
FIG. 2 is a schematic diagram of a second preferred alternate embodiment of the present invention that includes a light emitting diode as a light emitting device.

Referring now to FIG. 2, FIG. 2 is a schematic diagram of a second preferred embodiment of the present invention 18 (hereinafter, "second version" 18). The second version 18 includes the controller 4, the solar cell 6, the battery 8, the ambient light detector 10, the PCB 14 and a light emitting diode 20 (hereinafter, "LED" 20). The controller 4 is configured and/or programmed to provide electrical power from the battery 8 to the LED 20 for a period of time after the ambient light detector 10 indicates that an observed light intensity of the environment 16 has decreased below a prespecified value. The solar cell 6 is positioned to receive light energy from the sun (not shown) and is configured to capture photonic energy from received sunlight and generate electrical energy therefrom. The electrical energy generated by the solar cell 6 is transferred to the battery 8. The controller 4 further provides stored electrical energy from the battery 6 to the ambient light detector 10 if required and periodically to the LED 20.

The second version 18 may additionally include a plurality of second LED's 21 that may be cyclically energized by the controller 4 with electrical power from the battery 8 to emit. The cyclical energizing of each additional second LED 21 may cause the instant second LED 21 to emit a biomimicking light pattern, as the led 20 evidences and as enabled herein.

Figure 3:
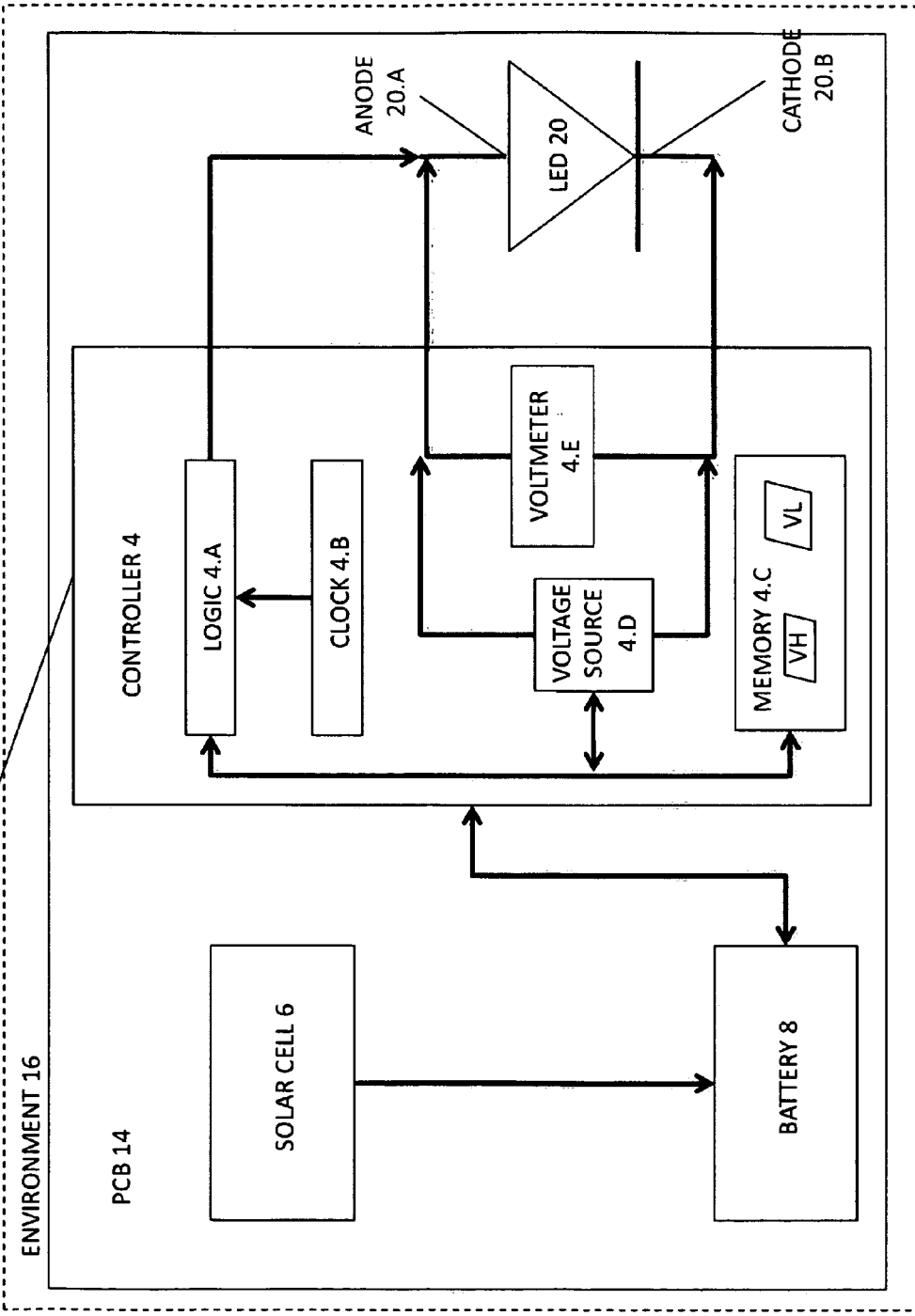
FIG. 3 is a schematic diagram of a third preferred alternate embodiment of the present invention wherein a light emitting diode is applied as both a light source and as an ambient light detector, and the controller comprises a voltmeter and a voltage source.

Referring now to FIG. 3, FIG. 3 is a schematic diagram of a third preferred embodiment of the present invention 22 (hereinafter, "third version" 22). The third version 22 Includes the controller 4, the solar cell 6, the battery 8, and the light emitting diode 12 (hereinafter, "LED" 12). The controller 4 further comprises a logic circuit 4.A, a clock circuit 4.B, a memory 4.C, a voltage source 4.D, and a voltmeter 4.E. The logic circuit 4.A is coupled with the battery 6 and the LED 20 and is configured and/or programmed to provide electrical power from the battery 6 to the LED 20 for a period of time after application of the voltage source 4.D and the voltmeter 4.E with the LED 20 indicates that an observed light intensity of the environment 16 has decreased below a prespecified value. The logic circuit 4.A may be reconfigurable. Additionally or alternatively, the memory 4.C may be or comprise a solid state memory that is reprogrammable. The clock circuit 4.B generates and emits clock pulses signal useful in measuring the passage of time by incrementing or decrementing a value maintained within the controller 4 upon detection of each clock pulse.

Figure 4:
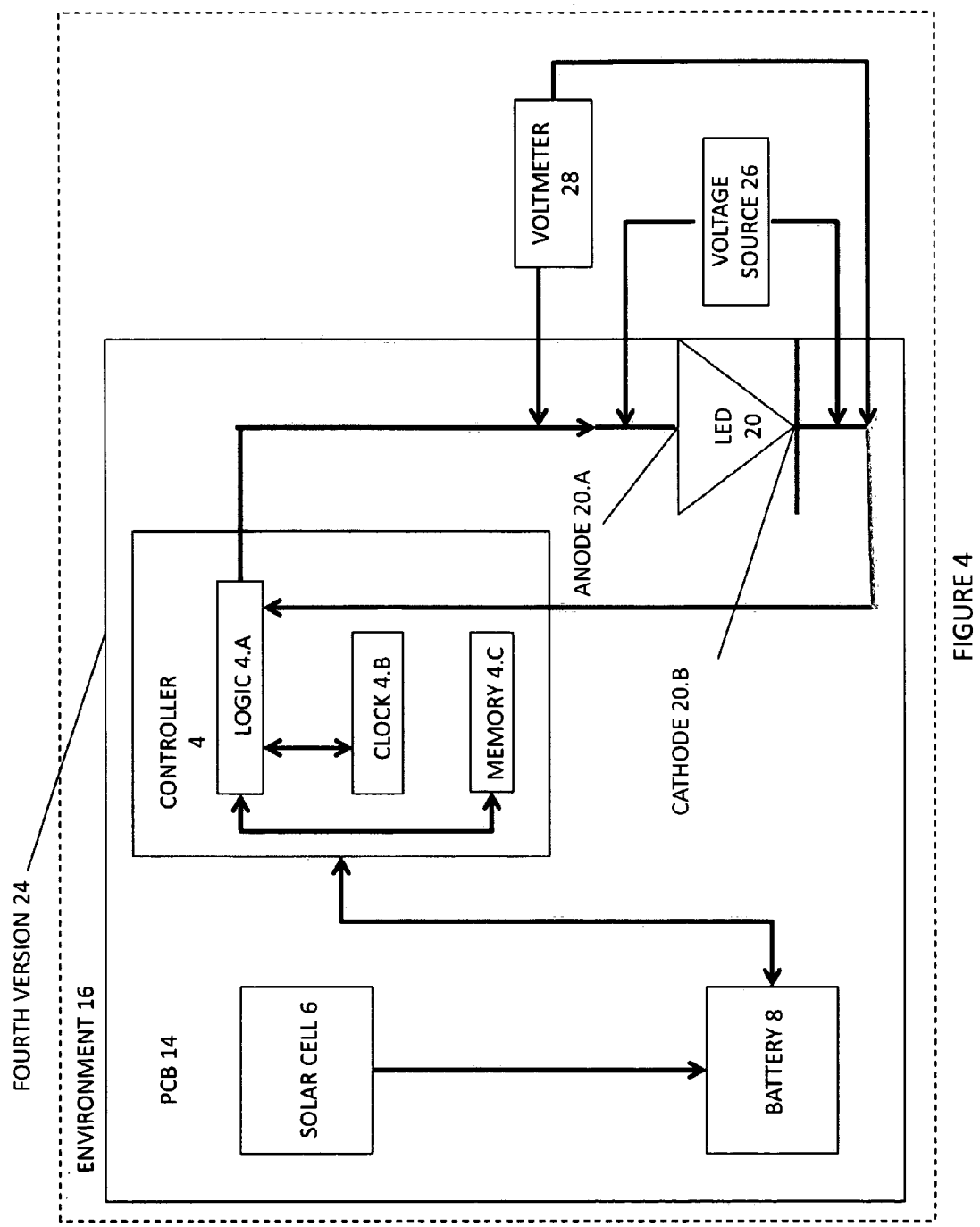
FIG. 4 is a schematic diagram of a fourth preferred alternate embodiment of the present invention wherein an external voltmeter and an external voltage source are coupled with the controller.

Referring now to FIG. 4, FIG. 4 is a schematic diagram of a fourth preferred embodiment of the present invention 24 (hereinafter, "fourth version" 24). The fourth version 24 includes the controller 4, the solar cell 6, the battery 8, and the LED 20. The fourth version 24 further includes an external voltage source 26 and an external voltmeter 28 that are coupled with the controller 4. The logic circuit 4.A is coupled with the battery 8 and the LED 20 and is configured and/or programmed to provide electrical power from the battery 8 to the LED 20 for a period of time after application of the external voltage source and the external voltmeter with the LED indicates that an observed light intensity of the environment 16 has decreased below a prespecified value.

Figure 5:
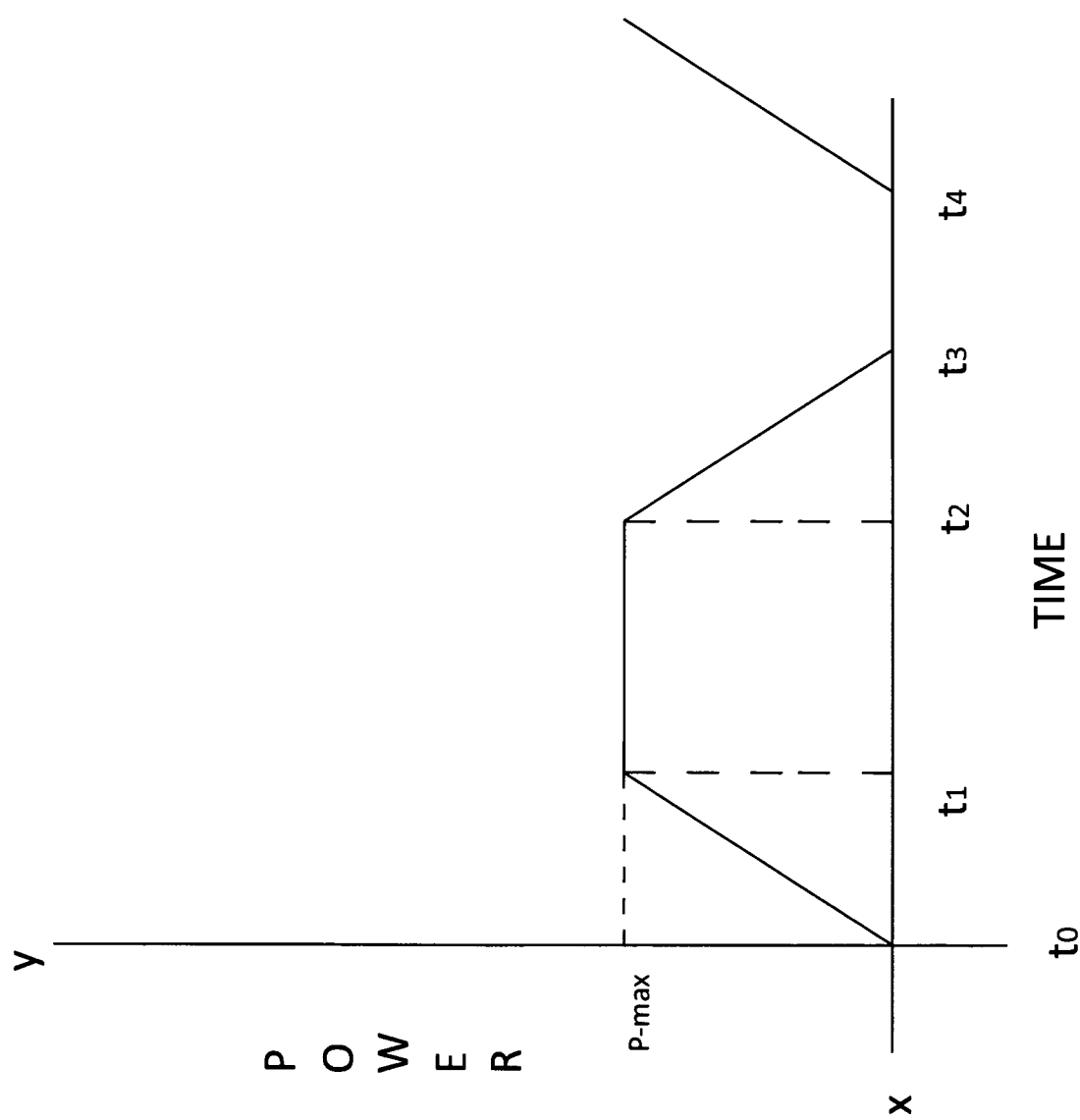
FIG. 5 is a schematic diagram of a profile of electrical energy provision to the light emitting device as enabled by the controller.

Referring now to FIG. 5, FIG. 5 is a schematic diagram of a profile of electrical energy provision to the LED 20, or other light emitting device 12, as enabled by the controller 4. An LED powering cycle extends from time t0 to time t4. The LED is powered off at time t0. A fade-on time segment value TW1 of the powering cycle occurs between time t0 and time t1. A full powered time segment value TW2 of the powering cycle transpires between time t1 and time t2. A fade off time segment value TW3 of the powering cycle transpires between time t2 and time t3. A power off time segment, value TW4 or occluded time segment value TW4, wherein little or no electrical power is provided to the LED 20 between time t3 and time t4, wherein time t4 is an initial point time t0 of a repetition of the powering cycle t0-t4.

The characteristics of the powering cycle of FIG. 5 can be designed to generate by means of the LED 20 a lighting pattern that mimics a naturally occurring referent bioluminescent pattern of a selected animal or insect. Nominal values for the time lengths of the time segment values TW1-TW4 of the powering cycle preferably include 0.25+/−5% seconds for the fade on time segment value TW1, 0.5+/−5% seconds for the full power segment value TW2, 0.5+/−5% seconds for the fade off segment value TW3, and 4.0+/−5% seconds of the power off segment value TW4. The totality of the time duration of the powering cycle may cause the LED 20 to mimic a flashing lighting pattern of a selected referent bioluminescent insect, such as a firefly.

It is understood that the time segment values TW1-TW4 may be altered by the controller 4 for one, some, or each execution of the LED powering cycle t0-t4. The alterations of the time segment values TW1-TW4 may be calculated according to an algorithm programmed into the controller 4 in order to slightly alter the length of time passing for example, between t3 and t4, when the LED 20 or 21 is occluded. The resultant variation in lengths of the occluded time length occurring between t3 and t4 reducing the possibility that any two devices 2, 18, 22, 24 will maintain synchronous LED powering cycles. This avoidance of synchronicity among pluralities of devices 2, 18, 22, and 20 will increase the perception of authenticity of the biomimicry of referent bioluminescent insects, e.g., fireflies. Intended by the method of the present invention.

Figure 6:
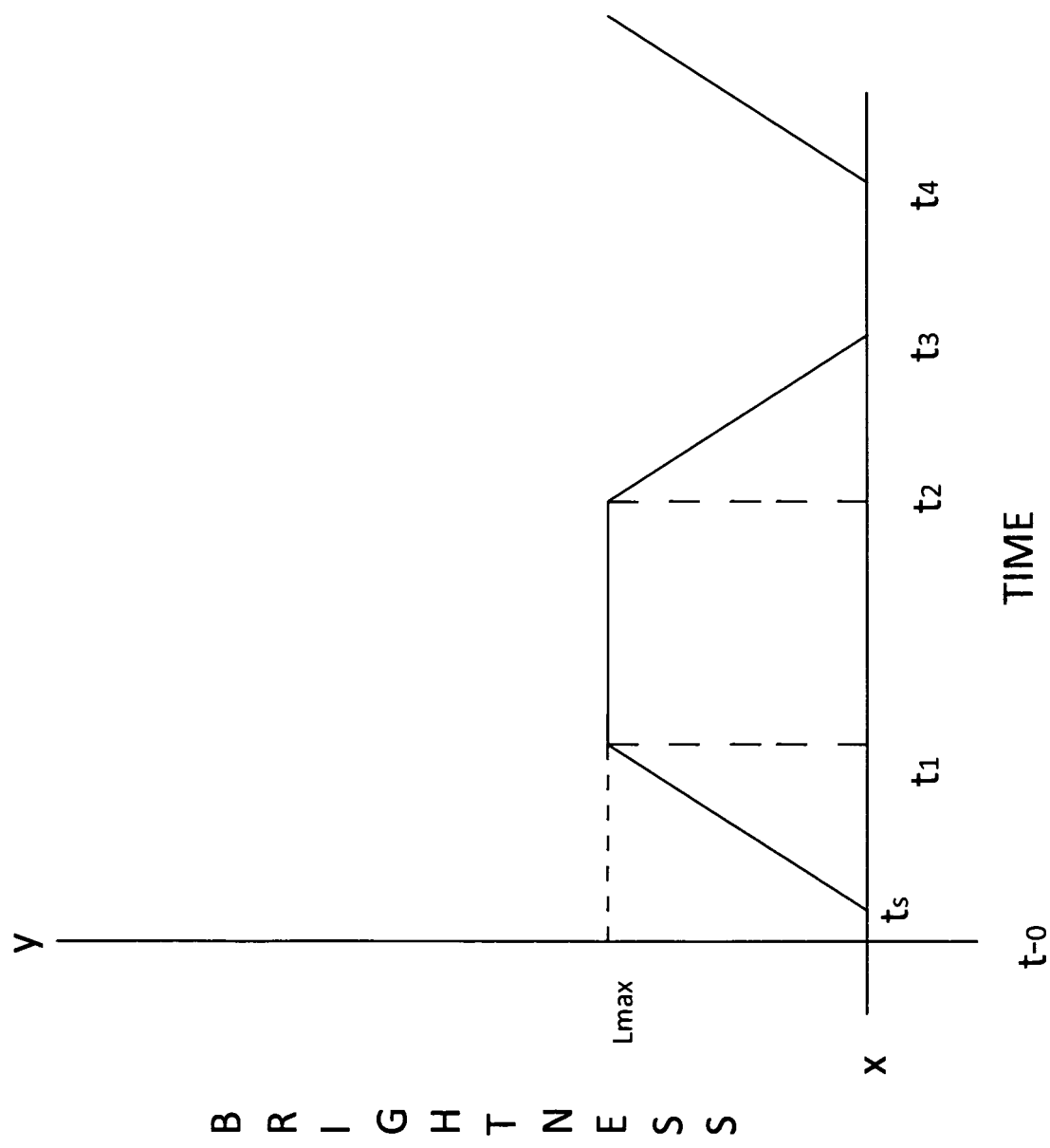
FIG. 6 is a schematic diagram of a profile of the light emitting behavior of a light emitting diode as the light emitting diode is provided with electrical power within a powering cycle as described in FIG. 5.

Referring now to FIG. 6, FIG. 6 is a schematic diagram of a profile of the light emitting behavior of the LED 20 as the LED 20 is provided with electrical power within a powering cycle t0-t4 as described in FIG. 5. The Lmax value may be on the order of 25 millicandelas +/−5%, or at another brightness level as selected by a designer to mimic a naturally occurring referent bioluminescent signal as emitted by, for example, a firefly. An offset time ts represents a latency of the LED 20 emitting light after electrical power delivery is enabled by the controller 4. It is understood that the offset time ts may vary from one powering cycle to another due to characteristics of the LED 20.

Figure 7A:
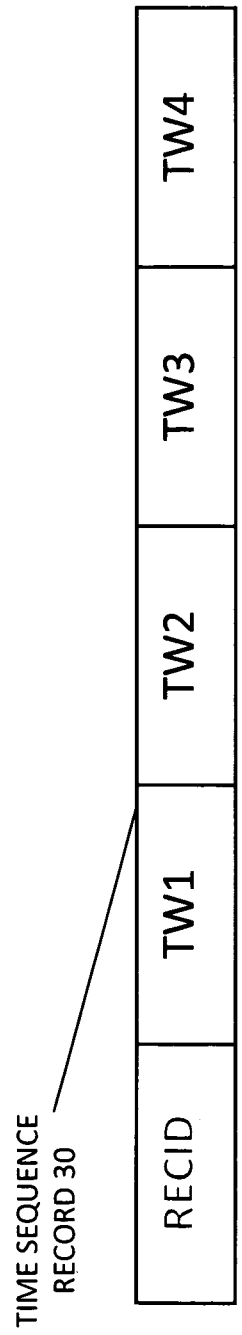
FIG. 7A represents a time sequence record of a lighting pattern as stored in the memory of the controller.
Figure 7B:
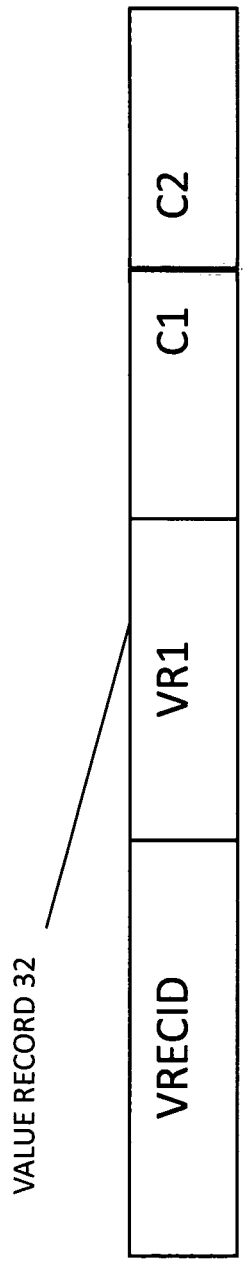
FIG. 7B represents a value record as maintained in the memory of the controller and includes stored values used in the instantiation of various alternate preferred embodiments of the method of the present invention.

Referring now to FIGS. 7A and 7B, FIG. 7A represents a time sequence record 30 of an LED lighting pattern TW1-TW4 as stored in whole or in part in the memory 4.C and/or the logic 4.A of the controller 4, and FIG. 7B represents a value record 32 as maintained in the memory 4.C of the controller and includes stored values used in the instantiation of various alternate preferred embodiments of the method of the present invention. The time sequence record 30 of FIG. 7A includes a record identifier RECID; a fade-on power segment time duration value TW1; a full powered segment time duration value TW2; a fade-off power segment time duration value TW3; and a power off time segment duration value TW4.

According to other additional alternate aspects of the method of the present invention, the memory 4.C or the controller 4.A may be reconfigurable or reprogrammable, and the time sequence record 30 may be reconfigured, whereby the pattern of light emission of one or more LED's 20 or 21 may be altered. Additionally a plurality of time sequence record 30 may be stored in the controller 4, wherein each time sequence record 30 is applied to an individual and separate second LED 21 for the purpose of mimicking the behavior of a plurality of fireflies or other bioluminescent insects.

Referring now to FIG. 7B, the stored value record 32 includes a value record identifier VRECID; a voltage magnitude value VR1; a first clock pulse trigger counter value C1; and a second clock pulse trigger counter value C2.

Figure 8:
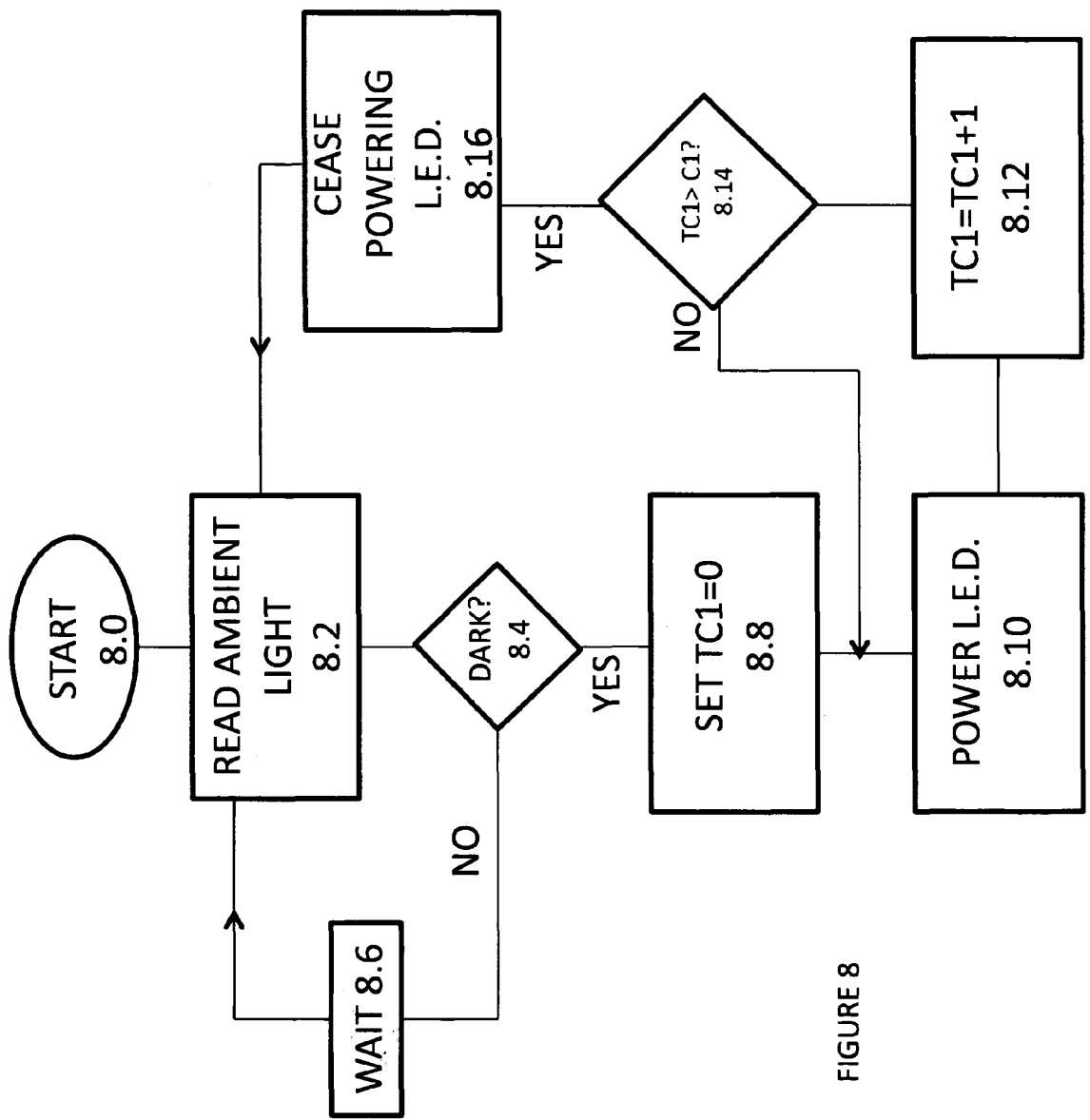
FIG. 8 is a flowchart of a first alternate preferred embodiment of the method of the present invention that uses a dedicated ambient light detector and wherein a light emitting device is powered on within a duty cycle until a clock time value has expired, e.g., after two hours of detection of dusk or ambient darkness, the light emitting device repeats a light emitting duty cycle for a two hour time period.

FIG. 8 is a flowchart of a first alternate preferred embodiment of the method of the present invention (hereinafter, "first method") that uses the ambient light detector 10 and wherein the light emitting device 12 is cycled on until a trigger clock time value C2 has expired. It is understood that the ambient light detection may be accomplished with an LED 20 that serves the dual purpose of ambient light detection and light pattern emission.

In step 8.2 the first version 2 (or other suitable alternate variation of the present invention 18, 22, or 24) makes a measurement of ambient light of the environment 16. In step 8.4 the first version 2 determines whether the ambient light measurement of step 8.2 is as low or lower than a pre-specified trigger luminescence value VL. When the ambient light measurement of step 8.2 is higher than the pre-specified luminescence value VL, the first version 2 proceeds from step 8.4 to step 8.6 and to execute a wait step before proceeding back again to perform the light intensity measurement step 8.2. The pre-specified trigger luminescence value VL may be stored in the controller memory 4.C.

When the first version 2 determines in step 8.4 that the ambient light measurement of step 8.2 is equal to or lower than the pre-specified trigger luminescence value VL, the controller 4 sets a first time counter TC1 to a zero value in step 8.8, and then initiates a time sequence as defined by the time sequence record 28 to energize the light emitting device 12, such as the LED 20, in step 8.10. The controller 4 further increments the first time counter TC1 in step 8.12.

In step 8.14 the controller 4 determines whether the first time counter TC1 has exceeded the first clock pulse counter trigger value C1 of the value record of FIG. 6B. When the controller 4 determines in step 8.14 that the first time counter TC1 has exceeded the first clock pulse counter value C1, the controller 4 proceeds on to step 8.16 and ceases enabling power delivery to the light emitting device 12 or 20. When the controller 4 determines in step 8.14 that the first time counter TC1 has not exceeded the first clock pulse counter value C1, the controller 4 proceeds again execute to step 8.10 and continues enabling power delivery to the light emitting device 12 or 20 in accordance with the time sequence record of FIG. 6A. The individual increments of the first time counter TC1 of each execution of step 8.12 and the first clock pulse counter value C1 may be selected to insure that the loop of steps 8.10 through 8.14 are repeated approximately for an intended period of time, e.g., a two hour lighting time. In one exemplary configuration of the first version 2, the second version 18, the third version 22, and/or the fourth version 24, the individual increments of first time counter TC1 of each execution of step 8.12 and the first clock pulse counter trigger value C1 are set to insure that the light emitting device 12 or 20 proceeds through the powering cycle of FIG. 5 preferably for a time of two hours +/−10 minutes. The aspects of the method of the present invention of FIG. 8 may be applied to cause executions of the loop of steps 8.10 through 8.14 to commence at some point during dusk and continue for preferably one to three hours after initiation.

Figure 9:
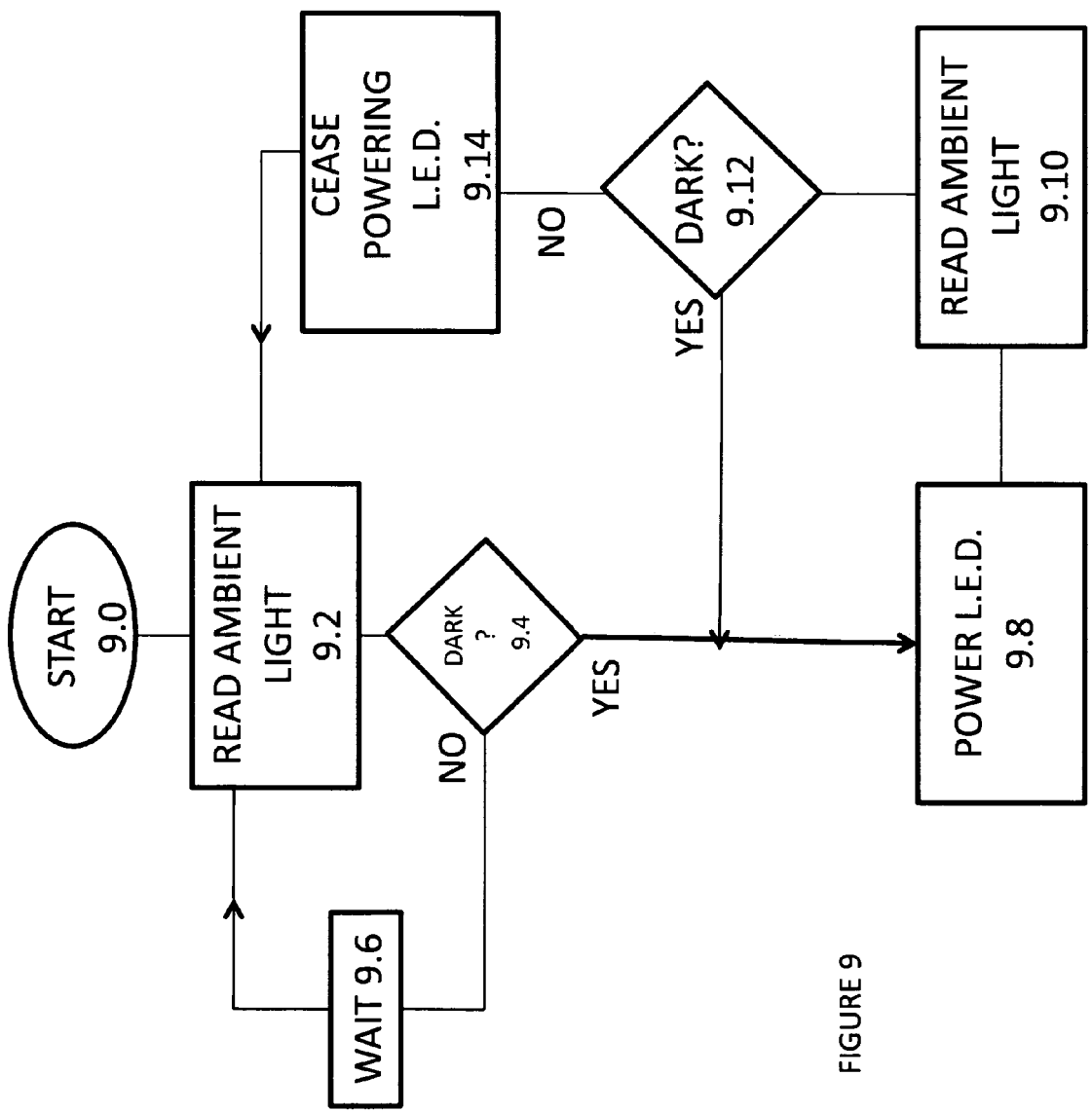
FIG. 9 is a flowchart of a second alternate preferred embodiment of the method of the present invention wherein a light emitting device is cycled on from a moment when an ambient light level is detected to be below a set value of light intensity and continuously therefore until an ambient light level is detected to be above a set value of light intensity.

FIG. 9 is a flowchart of a second alternate preferred embodiment of the method of the present invention (hereinafter, "second method") wherein a light emitting device 12 or 20 is cycled on until an ambient light intensity measurement exceeds a prespecified trigger value VR1.

In step 9.2 the first version 2 (or other alternate variation of the present invention 18, 22, or 24) makes a measurement of ambient light. In step 9.4 the first version determines whether the ambient light measurement of step 9.2 is below the low luminescence value VL and whether to proceed on to powering the light emitting device 12 or 20. When the ambient light measurement higher than the luminescence value VL, the first version 2 proceeds from step 9.4 to step 9.6 and to execute a wait step before proceeding back again to perform the light intensity measurement step 9.2.

When the first version 2 determines in step 9.4 that the ambient light measurement of step 9.2 is sufficiently low, the first version initiates a time sequence as defined by the time sequence record 28 to energize the light emitting device 12 or 20, such as the LED 20, in step 9.8. The first version 2 then performs an ambient light measurement in step 9.10. In step 9.12 the first version 2 determines whether the ambient light measurement of step 9.10 is greater than a prespecified high luminescence value VH. The high luminescence value VH may be selected to approximate an intensity level of luminescence expected to be experience by the first version during a dawn of a new day in the environment 16.

When the controller determines in step 9.12 that the ambient light measurement of step 9.10 is equal to or greater than the high luminescence value VH, the first version 2 proceeds from step 9.12 to step 9.14 and ceases enabling power delivery to the light emitting device 12 or 20.

When the controller determines in step 9.12 that the ambient light measurement of step 9.10 is less than the high luminescence value VH, the controller 4 proceeds again execute to step 9.8 and continues enabling power delivery to the light emitting device 12 or 20 in accordance with the time sequence record 28 of FIG. 7A. By this method of FIG. 9 the light emitting device 12 or 20 may be cycled through repeated executions of the illumination cycle TW1-TW4 from approximately dusk of a first day to approximately the dawn of a next day of the environment 16.

Figure 10:
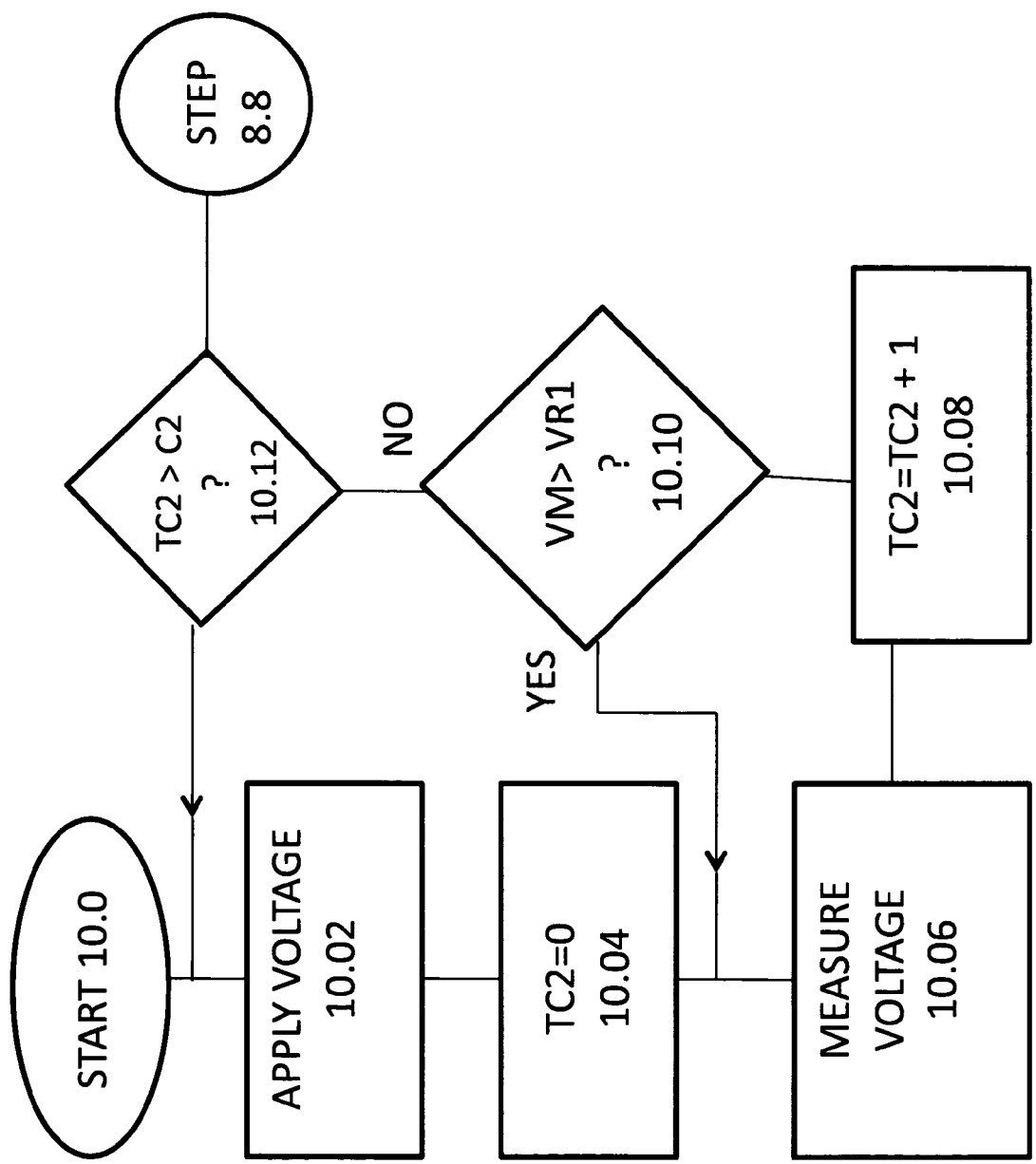
FIG. 10 is a flowchart of a third alternate preferred embodiment of the method of the present invention wherein a diode, such as a light emitting diode, is used as an ambient light intensity detector in combination with a voltmeter and a voltage source.

FIG. 10 is a flowchart of a third alternate preferred embodiment of the method of the present invention wherein a diode, such as the LED 20, is used as an ambient light intensity detector in combination with the voltmeter 4.E or 28 and the voltage source 4.D or 26. In step 10.02 a reference test voltage VR1 is applied across an anode 20.A and a cathode 20.B of the LED 20 of FIGS. 3 and 4 by means of the voltage source 4.D or 26 under the direction of the controller logic 4.A. In step 10.04 a second time counter TC2 is set to zero. The voltmeter 4.E or 28 is then applied to take a dynamic voltage measurement VM across the diode anode 20.A and cathode 20.D in step 10.06 the second time counter TC2 is incremented in step 10.08, and the voltage measurement VM is compared with a second stored voltage value VR2 in step 10.10. The second stored voltage value VR2 is lower than the value of the reference voltage VR1. The decay time Td of the actual voltage across the anode 20.A and a cathode 20.B of the LED 20 from the imposed reference voltage VR1 to the second stored voltage value VR2 is indicative of the intensity of ambient light of the environment 16. The second stored trigger voltage value VR2 and a value of the reference voltage VR1 may be stored in the memory 4.C When the controller 4 determines in step 10.10 that the voltage measurement of step 10.06 is greater than the second stored voltage value VR2, the controller 4 proceeds from step 10.10 to again execute step 10.06. Alternatively, when the controller determines in step 10.10 that the voltage measurement of step 10.06 is not greater than the second stored voltage value VR2, the controller 4 proceeds from step 10.10 to again execute step 10.12.

In step 10.12 the controller 4 compares the second time counter TC2 to a stored second clock pulse trigger value C2. The magnitude of the value of the second time counter TC2 indicates how quickly the voltage across the anode 20.A and the cathode 20.B is degrading to the second stored trigger voltage value VR2, and therefore indicates whether the LED 20 is experiencing an ambient light above or below a certain level of intensity. The controller 4 proceeds on to step 10.02 when the comparison of step 10.12 indicates that the ambient light of the environment 16 is too high in intensity to initiate an electrical powering of the LED. The controller 4 may optionally in step 10.2 to derive the intensity of the ambient light from the voltage decay time observed across the anode 20.A and the cathode 20.B as indicated by the magnitude of the value of the second time counter TC2.

Alternatively, when the comparison of step 10.12 indicates that the ambient light of the environment 16 is low enough in intensity to cause an initiation of an electrical powering of the LED 20, the controller 4 proceeds from step 10.12 to step 8.8 or 9.8 and to initiate enabling power delivery to the LED 20 in accordance with the time sequence record of FIG. 7A.

It is known to one skilled in the art that the appearance of bioluminescent light emissions by insects, to include fireflies, may be mimicked by the use of mechanical light emitters. Mechanical light emitters may generate light emissions that vary in intensity and duration from the referent bioluminescent light emissions that are to be mimicked, but which are perceived by casual human visual observation to be equivalent to the mimicked referent bioluminescent light emission.

Figure 11:
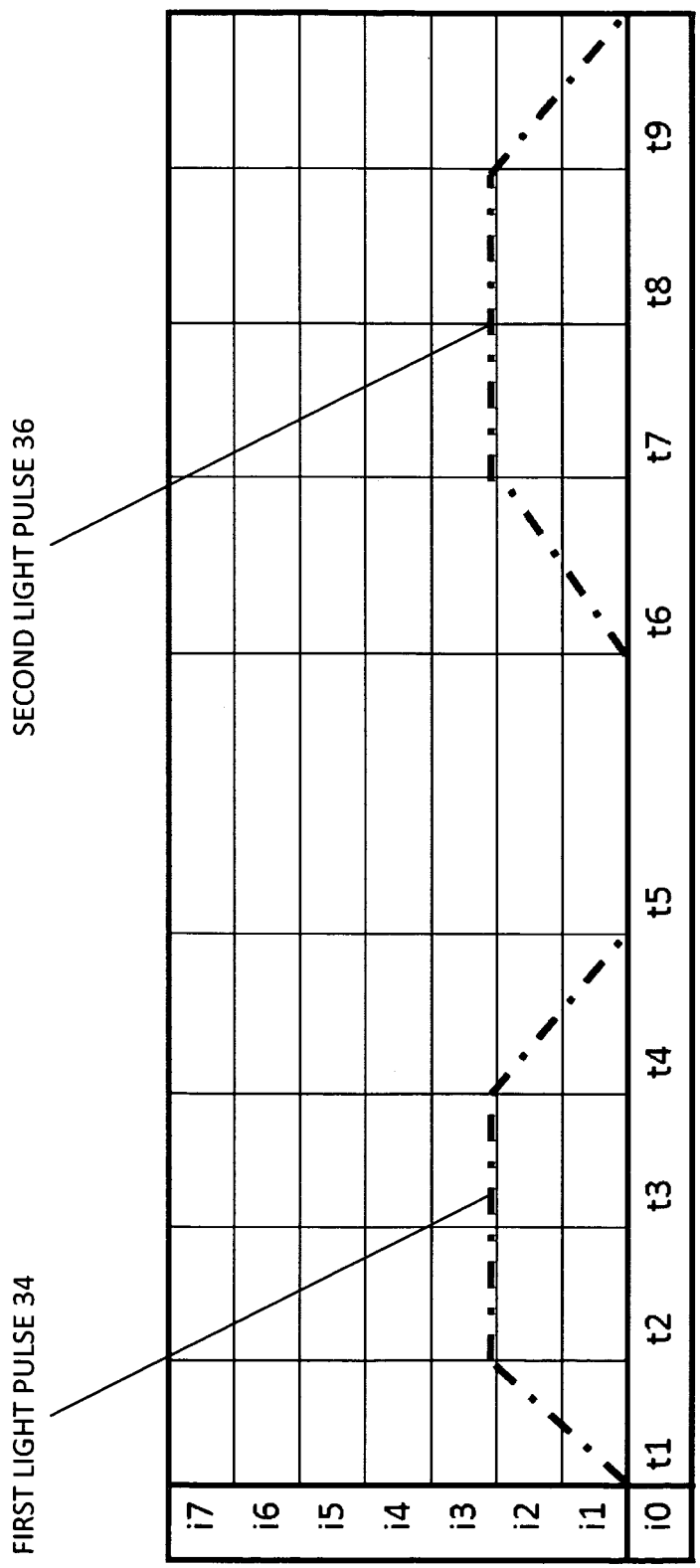
FIG. 11 is an illustration of a generic exemplar of light emitting behavior by certain bioluminescent insects, such as fireflies.

FIG. 11 is a graph of a generic exemplar of light emitting behavior by bioluminescent insects. Insects utilize bioluminescent organs to generate distinctive light signatures defined by intensity of light emitted, duration of emitted light pulses, and duration of occluded light periods between individual light pulses. Each individual light pulse 34 and 36 may comprise a ramp up period defined by time period t1 to t2 during which emitted light intensity increases from i0 to i2, an emission phase defined by a time period of t2 to t3 during which emitted light intensity is stable at i2 +/−10%, and a ramp down phase defined by a time period of t4 to t5 during which emitted light intensity decreases from i2 to i0. Individual light pulses LP may be separated by occluded light time lengths t5 to t6. A plurality of individual light pulses LP may each be separated by an occluded light period LO to generate a pattern. Insects may or may not vary the values of the time and intensity increments for each individual light pulse LP and occluded period LO in order to generate species specific light signatures. Such signatures may be perceived as fluctuations in pulse intensity, duration, and occluded period.

Figure 12:
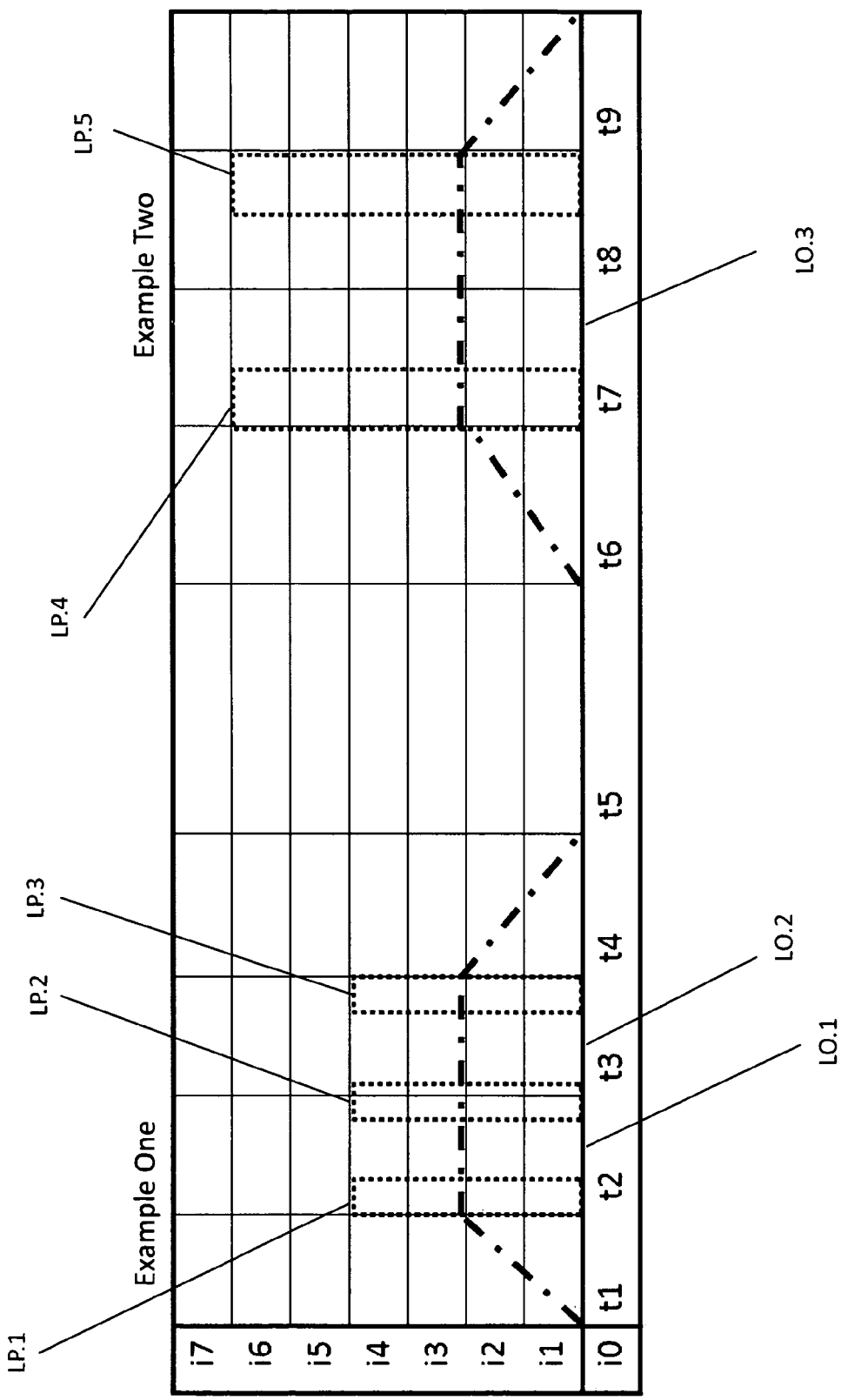
FIG. 12 is a diagram of an exemplar of mimicry of bioluminescent light patterns emitted by fixed intensity light emitting diodes of FIGS. 2, 3 and 4.

FIG. 12 is an exemplar of mimicry of bioluminescent light patterns by fixed intensity LED's 20. LED's 20 may generate a light emission intensity of i6 or i7 that might be modified by electrical current magnitude control. However when current input modulation control is not possible or not undesirable, the LED's 20 will typically generate a light energy emission of a single, fixed maximum intensity when energized. LED light emission intensity may be greater than the bioluminescent light intensity that is being mimicked. The time lengths of LED light emission LP and occlusion periods LO between pulses of LED light emission may be calibrated to cause the human or mammalian eye to perceive a continuous lighted time length t1-t5. An algorithm may be generated and stored in the memory 4.C that comprises LED light emission intensity, time period of LED light emission, and time period of light occlusion between LED light emissions. This algorithm may be manipulated to allow an LED 20, or plurality of LED's 20, to generate a pattern, or a plurality of patterns, of combined LED light emission intensities, LED light emission pulses LP, and light occlusion periods LO that may be perceived by casual human visual observation to appear as equivalent to the bioluminescent pattern that is being mimicked.

Referring to FIG. 12, a plurality of patterns of LED light emissions pulses LP.1-LP.5 separated by light occlusion time lengths LO.1-LO.3 may be utilized to mimic the pattern of bioluminescent light emission of a particular insect. In generic example one, a series of LED light pulses LP.1-LP.5 of intensity i4 separated by occlusion time lengths LO.1-LO.3 of light intensity i0 during a time period of t2 to t4 may be perceived by casual human observation to appear as a single light pulse of intensity i2 occurring during a time period of t1 to t5. In generic example two, a series of LED light emission pulses of intensity i6 separated by separate occlusion time lengths LO.1-LO.3 of light intensity i0 during a time length of t7 to t9 may be perceived by human visual observation to appear as a single light pulse of intensity i2 occurring during a time period of t6 to t10.

Preferably the lengths of the light emissions pulses LP.1-LP.5 are greater than 1/30 of a second and the lengths of occluded time lengths are L.0-L.3 are less than 1/30 of a second.

Figure 13:
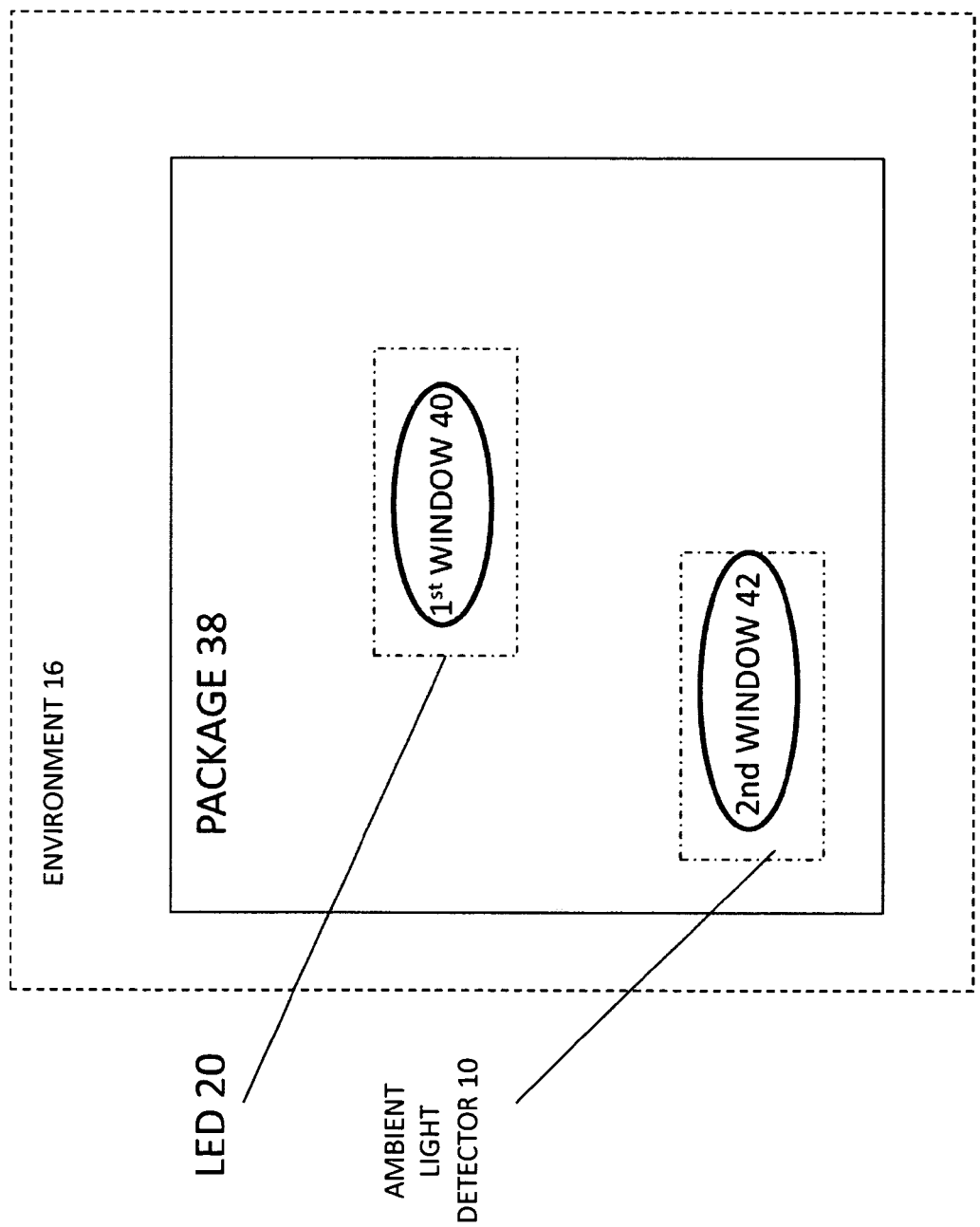
FIG. 13 is an illustration of a front view of a package enclosing the printed circuit board and attached components of FIGS. 1, 2, 3 and 4.

Referring now generally to the Figures and particularly to FIGS. 1 and 13, FIG. 13 is a front view of a package 38 that is additionally enclosing and comprised within the first version 2, the second version 18, the third version 22 and/or the second version 24. The package encloses the PCB 14 and the elements 4-20, 26 and 28 mounted onto the PCB 14. An optically transparent window 40 of the package 38 permits light energy emitted by the light emitting device 12, the LED 20, and/or the second LED's 21 to exit the package 38 and be received by an observer (not shown). The package 39 may be or comprise a metal, a plastic, or other suitable material known in the art. The transparent window 40 may be or comprise an optically transparent plastic or glass, or other suitable transparent material known in the art.

An additional, optional and optically transparent second window 42 of the package 38 permits light energy from the environment 16 to enter the package 38 and be received by the ambient light detector 10. The transparent second window 42 may be or comprise an optically transparent plastic or glass, or other suitable transparent material known in the art.

The foregoing disclosures and statements are illustrative only of the present invention, and are not intended to limit or define the scope of the present invention. The above description is intended to be illustrative, and not restrictive. Although the examples given include many specificities, they are intended as illustrative of only certain possible applications of the present invention. The examples given should only be interpreted as illustrations of some of the applications of the present invention, and the full scope of the present invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

We claim:

1. A bio-mimicry device comprising:
   a. A solar energy collector for capturing light-wave energy and generating electrical energy;
   b. An electrical battery for storing electrical energy, the battery coupled with the solar energy collector;
   c. A dual-purpose light emitter ("light emitter") coupled both with the battery and a control logic, the light emitter for emitting light upon receipt of electrical current from the battery and adapted to sense light intensity and indicate light intensity levels to the control logic; and
   d. The control logic coupled with the battery and the light emitter, and the control logic adapted for both responding to light intensity level indications received from the light emitter and for controlling a time sequence of electrical current variations to the light emitter.

2. The bio-mimicry device of claim 1, wherein the control logic is coupled with the light emitter and is disposed between battery and the light emitter, whereby the electrical current travels through the control circuit en route to the light emitter.

3. The bio-mimicry device of claim 1, wherein the control logic is programmable and the time sequence is reconfigurable.

4. The bio-mimicry device of claim 1, wherein the light emitter comprises a light emitting diode.

5. The bio-mimicry device of claim 4, wherein the light emitter when receiving the electrical current generates a peak emission wavelength within 50 nanometers of a referent bioluminescent light source.

6. The bio-mimicry device of claim 1, wherein the light emitter when receiving the electrical current generates a peak emission wavelength within the range of from 500 nanometers to 700 nanometers.

7. The bio-mimicry device of claim 1, further comprising a plurality of light emitters, wherein each light emitting diode is coupled to the battery and the control logic enables delivery of the electrical current to each of the plurality of emitters according to a group time sequence.

8. The bio-mimicry device of claim 1, further comprising a second battery, the second battery coupled with the light emitter and for delivering electrical current to the light emitter as enabled by the control logic.

9. The bio-mimicry device of claim 1, wherein the light emitter produces light energy at a brightness of at least 25 candelas.

10. The bio-mimicry device of claim 1, wherein the light emitter emits light in a dispersion pattern extending beyond 120 degrees in two orthogonal dimensions.

11. The bio-mimicry device of claim 1, wherein the time sequence includes a lighting time period of light emission from the light emitter and a separation time between time periods of light emission.

12. The bio-mimicry device of claim 11, wherein the control logic enables electrical current delivery to the light emitter in an increasing ramp during a fade-on element of the lighting time period.

13. The bio-mimicry device of claim 11, wherein the control logic reduces electrical current delivery to the light emitter in a decreasing ramp during a fade-off element of the lighting time period.

14. The bio-mimicry device of claim 13, wherein the control logic enables electrical current delivery to the light emitter in an increasing ramp during a fade-on element of the lighting time period, whereby a biologically occurring signal is mimicked.

15. The bio-mimicry device of claim 1, further comprising an ambient light sensor coupled with the control logic, wherein a measurement of ambient light generated by the ambient light sensor is interpreted by the control logic in a determination of when to enable electrical current delivery to the light emitter.

16. The bio-mimicry device of claim 15, wherein the control logic enables electrical current delivery to the light emitter according to the time sequence when the ambient light sensor provides an ambient light measurement below a first trigger value.

17. The bio-mimicry device of claim 15, wherein the control logic disables electrical current delivery to the light emitter when the ambient light sensor provides an ambient light measurement above a second trigger value.

18. The bio-mimicry device of claim 15, wherein the control logic further comprises a time counter, and the control logic disables electrical current delivery to the light emitter when the time counter exceeds a maximal time value.

19. The bio-mimicry device of claim 15, wherein the control logic further comprises a time counter, and the control logic disables electrical current delivery to the light emitter when the ambient light sensor provides an ambient light measurement above a second trigger value and the time counter exceeds a minimal time period length.

20. The bio-mimicry device of claim 15, wherein the time sequence enables the light emitter to mimic a bioluminescent lighting pattern generally exhibited by a selected species of insect.

\* \* \* \* \*